US012676841B2

(12) United States Patent
Khare et al.

(10) Patent No.: US 12,676,841 B2
(45) Date of Patent: Jul. 7, 2026

(54) AUTHENTICATION OF NETWORK REQUEST

(71) Applicant: Nokia Technologies Oy, Espoo (FI)

(72) Inventors: Saurabh Khare, Bangalore (IN);
Chaitanya Aggarwal, Munich (DE);
Anja Jerichow, Grafing bei Munich (DE)

(73) Assignee: Nokia Technologies Oy, Espoo (FI)

( * ) Notice: Subject to any disclaimer, the term of this patent is extended or adjusted under 35 U.S.C. 154(b) by 427 days.

(21) Appl. No.: 17/568,102

(22) Filed: Jan. 4, 2022

(65) Prior Publication Data

US 2022/0217127 A1      Jul. 7, 2022

(30) Foreign Application Priority Data

Jan. 7, 2021    (FI) ..................................... 20215013

(51) Int. Cl.
*H04L 9/40*        (2022.01)
*H04L 9/32*        (2006.01)

(52) U.S. Cl.
CPC ............ *H04L 63/08* (2013.01); *H04L 9/3247* (2013.01)

(58) Field of Classification Search
CPC .............................. H04L 63/08; H04L 9/3247
See application file for complete search history.

(56) References Cited

U.S. PATENT DOCUMENTS

| | | | |
|---|---|---|---|
| 10,833,938 B1 | 11/2020 | Rajput et al. | |
| 2015/0150109 A1 | 5/2015 | Bocanegra et al. | |

| | | | | |
|---|---|---|---|---|
| 2019/0251241 A1* | 8/2019 | Bykampadi | ......... | H04W 12/009 |
| 2020/0153707 A1 | 5/2020 | Lu et al. | | |
| 2020/0275255 A1 | 8/2020 | Wang et al. | | |
| 2020/0305033 A1* | 9/2020 | Keller | ............. | H04W 36/00226 |
| 2021/0136068 A1* | 5/2021 | Smeets | ................... | H04L 63/10 |
| 2021/0250172 A1* | 8/2021 | Choyi | ................... | H04L 9/3239 |
| 2022/0217127 A1* | 7/2022 | Khare | ................ | H04L 63/0876 |

(Continued)

FOREIGN PATENT DOCUMENTS

| | | |
|---|---|---|
| CN | 109688586 A | 4/2019 |
| WO | 2020/030852 A1 | 2/2020 |
| WO | 2020/147663 A1 | 7/2020 |

OTHER PUBLICATIONS

Office Action received for corresponding Chinese Patent Application No. 202210010094.5, dated Feb. 27, 2024, 8 pages of Office Action and 6 pages of summary and translation available.

(Continued)

*Primary Examiner* — Harris C Wang
(74) *Attorney, Agent, or Firm* — Barta Jones, PLLC

(57)        ABSTRACT

According to an example aspect of the present invention, there is provided an apparatus configured to receive a service request for a service provided by the apparatus, determine whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or same network function instance set, and provide the service responsive to a result of the determination indicating the service is to be provided.

14 Claims, 5 Drawing Sheets

(56) References Cited

U.S. PATENT DOCUMENTS

2022/0286464 A1\* 9/2022 Zhao .................... H04L 63/104

OTHER PUBLICATIONS

Extended European Search Report received for corresponding European Patent Application No. 22150124.0, dated May 12, 2022, 10 pages.
"Access token ownership verification by the producer in indirect communication scenarios", 3GPP TSG-SA3 Meeting #98Bis-e, S3-200798, Nokia, Apr. 14-17, 2020, 7 pages.
"3rd Generation Partnership Project; Technical Specification Group Services and System Aspects; Security architecture and procedures for 5G system (Release 16)", 3GPP TS 33.501, V16.2.0, Mar. 2020, pp. 1-227.
"5G; Security architecture and procedures for 5G System (3GPP TS 33.501 version 16.4.0 Release 16)", ETSI TS 133 601, V16.4.0, Nov. 2020, 252 pages.
European Communication pursuant to Article 97(3) EPC, corresponding to EP Application No. 22 150 124.0, dated Jun. 4, 2024.
Office action received for corresponding European Patent Application No. 22150124.0, dated Aug. 4, 2023, 11 pages.
Office action received for corresponding European Patent Application No. 22150124.0, dated Apr. 8, 2024, 8 pages.

Chinese Office Action with machine English translation, corresponding to CN Application No. 202210010094.5, dated Aug. 30, 2024.
Chinese Office Action, with English machine translation, corresponding to CN Application No. 2022100100945, dated Oct. 23, 2024.
Rejection Decision dated Mar. 17, 2025 corresponding to Chinese Patent Application No. 202210010094.5, with English translation thereof.
Emadinia et al., "An Updateable Token-Based Schema for Authentication and Access Management in Clouds", 7th International Conference on Future Internet of Things and Cloud (FiCloud), Aug. 26-28, 2019, pp. 50-56.
Hardt, "The OAuth 2.0 Authorization Framework", RFC 6749, Internet Engineering Task Force (IETF), Oct. 2012, pp. 1-76.
Office action received for corresponding Finnish Patent Application No. 20215013, dated May 31, 2021, 10 pages.
"3rd Generation Partnership Project; Technical Specification Group Services and System Aspects; Security architecture and procedures for 5G system (Release 17)", 3GPP TS 33.501, V17.0.0, Dec. 2020, pp. 1-253.
"3rd Generation Partnership Project; Technical Specification Group Core Network and Terminals; 5G System; Technical Realization of Service Based Architecture; Stage 3 (Release 17)", 3GPP TS 29.500, V17.1.0, Dec. 2020, pp. 1-90.

\* cited by examiner

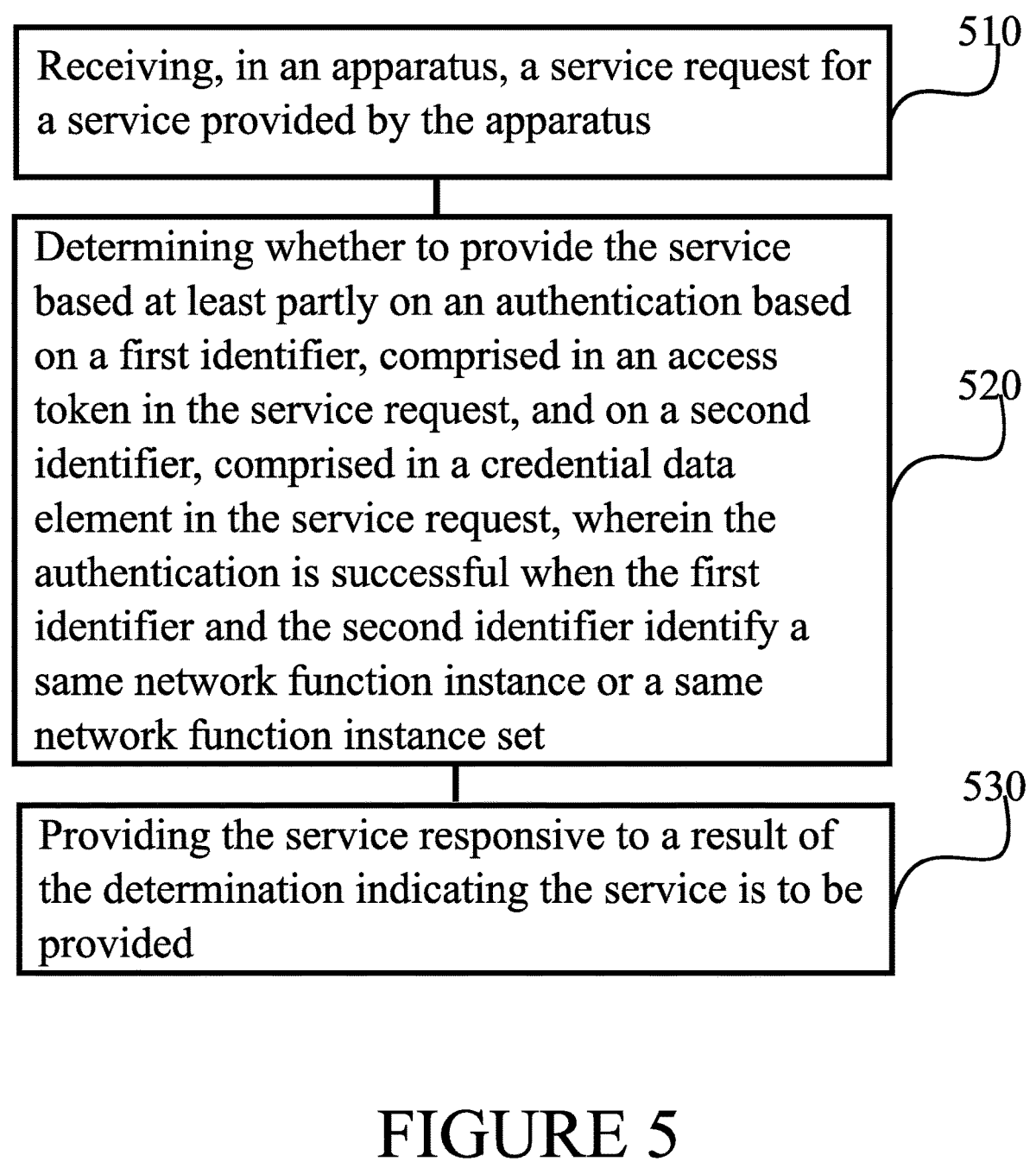

Receiving, in an apparatus, a service request for a service provided by the apparatus — 510

Determining whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or a same network function instance set — 520

Providing the service responsive to a result of the determination indicating the service is to be provided — 530

FIGURE 5

AUTHENTICATION OF NETWORK REQUEST

FIELD

The present disclosure relates to security procedures, such as authentication procedures, in communication networks.

BACKGROUND

In networks supporting wireless or wire-based communication, discovering network functions, NFs, and network function services is of interest as many network function instances may be virtualized and be of a dynamic nature. Core network, CN, entities may seek to discover a set of one or more NF instances and NF service instances for a specific NF service or an NF type. Examples of such CN entities include NFs and service communication proxies, SCPs. Examples of NF instances to be discovered include application functions, gateways and subscriber data repositories, and also application related functions, for example for vertical industry support, or entertainment. Further examples include a resource control or management function, a session management or control function, an interworking, data management or storage function, an authentication function or a combination of one or more of these functions. NF service instances, known also as NF services, include individual services provided by an NF. One NF may be configured to provide more than one service, wherein each of the more than one service may be reachable using a different approach, such as a different address or port or communication protocol.

NF service discovery may be enabled via a NF discovery procedure, as specified for wireless communication networks in technical specifications established by the third generation partnership project, 3GPP, or GSMA, GSM association, for example. However, technology disclosed herein has relevance also to wire-line communication networks.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to receive a service request for a service provided by the apparatus, determine whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or same network function instance set, and provide the service responsive to a result of the determination indicating the service is to be provided.

According to a second aspect of the present disclosure, there is provided an apparatus comprising at least one processing core, at least one memory including computer program code, the at least one memory and the computer program code being configured to, with the at least one processing core, cause the apparatus at least to provide a service request for a service at a network function provider to the network function provider without routing the service request to a service communication proxy, and include in the service request a credential data element.

According to a third aspect of the present disclosure, there is provided a method, comprising receiving, in an apparatus, a service request for a service provided by the apparatus, determining whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or same network function instance set, and providing the service responsive to a result of the determination indicating the service is to be provided.

According to a fourth aspect of the present disclosure, there is provided a method, comprising providing a service request for a service at a network function provider to the network function provider without routing the service request to a service communication proxy, and including in the service request a credential data element.

According to a fifth aspect of the present disclosure, there is provided an apparatus comprising means for receiving, in an apparatus, a service request for a service provided by the apparatus, means for determining whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or same network function instance set, and means for providing the service responsive to a result of the determination indicating the service is to be provided.

According to a sixth aspect of the present disclosure, there is provided an apparatus comprising means for providing a service request for a service at a network function provider to the network function provider without routing the service request to a service communication proxy, and means for including in the service request a credential data element.

According to a seventh aspect of the present disclosure, there is provided a non-transitory computer readable medium having stored thereon a set of computer readable instructions that, when executed by at least one processor, cause an apparatus to at least receive a service request for a service provided by the apparatus, determine whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or same network function instance set, and provide the service responsive to a result of the determination indicating the service is to be provided.

According to an eighth aspect of the present disclosure, there is provided a non-transitory computer readable medium having stored thereon a set of computer readable instructions that, when executed by at least one processor, cause an apparatus to at least provide a service request for a service at a network function provider to the network function provider without routing the service request to a service communication proxy, and include in the service request a credential data element.

According to a ninth aspect of the present disclosure, there is provided a computer program configured to cause an apparatus to perform at least the following, when run: receive a service request for a service provided by the apparatus, determine whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or same network function instance set, and provide the service responsive to a result of the determination indicating the service is to be provided.

According to a tenth aspect of the present disclosure, there is provided a computer program configured to cause an apparatus to perform at least the following, when run: provide a service request for a service at a network function provider to the network function provider without routing the service request to a service communication proxy, and include in the service request a credential data element.

According to an eleventh tenth aspect of the present disclosure, there is provided an apparatus comprising at least one processing core, at least one memory including computer program code, the at least one memory and the computer program code being configured to, with the at least one processing core, cause the apparatus at least to receive a service request for a service provided by the apparatus, determine whether to provide the service based at least partly on an authentication based on a first identifier, comprised in an access token in the service request, and on a second identifier, comprised in a credential data element used to secure a connection between the apparatus and a network function consumer, wherein the authentication is successful when the first identifier and the second identifier identify a same network function instance or same network function instance set, and provide the service responsive to a result of the determination indicating the service is to be provided.

BRIEF DESCRIPTION OF THE DRAWINGS

FIG. 5 is a flow graph of a method in accordance with at least some embodiments of the present invention.

EMBODIMENTS

In a service based architecture, access token misuse may be guarded against by implementing an authentication process as will be disclosed herein. In detail, a service-providing network function provider, NFp, may be configured to verify that an incoming service request has a credential data element of a service consuming NF, NFc, such as, for example, a client credentials assertion, CCA, data element of a NFc, which has an identifier consistent with an identifier in an access token comprised in the same service request.

For example, the identifiers may identify the same NF instance, the NFc, or a same NF instance set. An NF instance set may comprise more than one NF instance. In case the identifiers are conflicting, the network function provider may reject the service request with an error message, or by simply discarding the service request, for example. Thus the network is protected against, for example, a maliciously performing, compromised service communication proxy.

Figure 1:
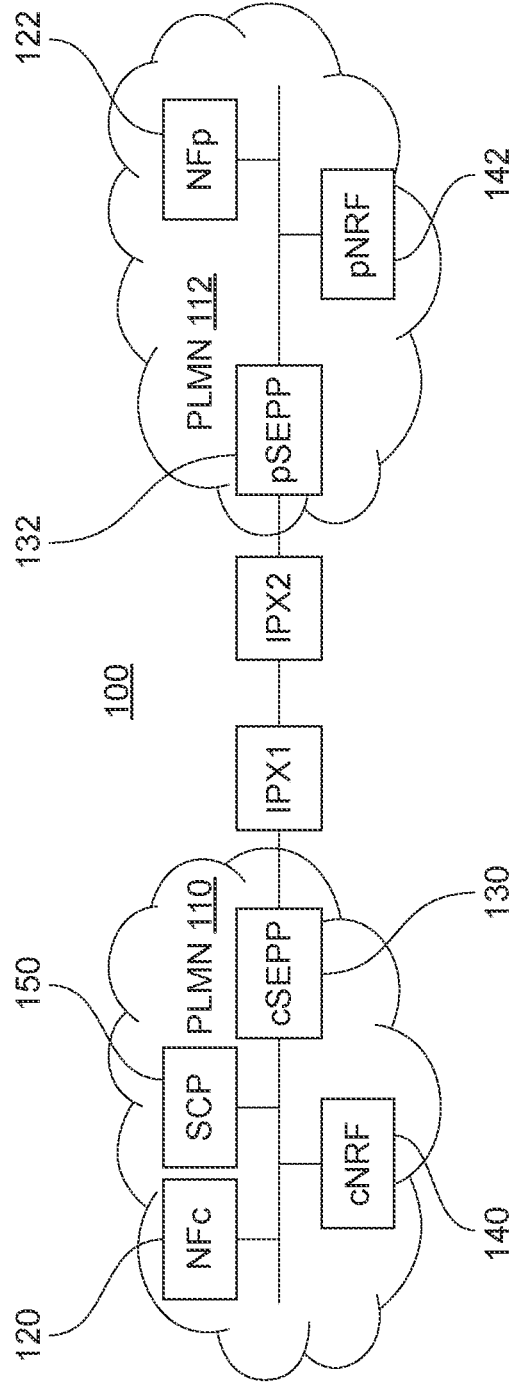
FIG. 1 illustrates an example system in accordance with at least some embodiments of the present invention.

FIG. 1 illustrates an example system 100 in accordance with at least some embodiments of the present invention. The system comprises two public land mobile networks, PLMNs, 110, 112, each equipped with a network function, NF, 120, 122. A network function may refer to an operational and/or a physical entity. A network function may be a specific network node or element, or a specific function or set of functions carried out by one or more entities, such as virtualized network elements, VNFs. One physical node may be configured to perform plural NFs. Examples of such network functions include a resource control or management function, session management or control function, inter-working, data management or storage function, authentication function or a combination of one or more of these functions.

In case of a third generation partnership project, 3GPP, fifth generation, 5G, system service based architecture, SBA, core network, NFs may comprise at least some of an access and mobility management function, AMF, a session management function, SMF, a network slice selection function, NSSF, a network exposure function, NEF, a network repository function, NRF, a unified data management, UDM, an authentication server function, AUSF, a policy control function, PCF, and an application function, AF. A NEF is configured to provide access to exposed network services and capabilities. A UDM is configured to manage network user data in a single, centralized element. The PLMNs each may further comprise a security edge protection proxy, SEPP, 130, 132 configured to operate as a security edge node or gateway. The NFs may communicate with each other using representational state transfer, REST, application programming interfaces, for example. These may be known as RESTful APIs. Further examples of NFs include NFs related to gaming, streaming or industrial process control. The system may comprise also nodes from 3G or 4G node systems, such as home subscriber server, HSS, and a suitable interworking function for protocol translations between e.g. Diameter and JSON-based RESTful APIs. While described herein primarily using terminology of 5G systems, the principles of the invention are applicable also to other communication networks using proxies as described herein, such as 4G networks and non-3GPP networks, for example.

While the example of FIG. 1 has two PLMNs 110, 122, in general at least some embodiments of the invention may be practiced in a single PLMN, which need not necessarily have SEPPs. In a two-PLMN case, in FIG. 1, the SEPP 130, 132 is a network node at the boundary of an operator's network that may be configured to receive a message, such as an HTTP request or HTTP response from an NF, to apply protection for sending and to forward the reformatted message through a chain of intermediate nodes, such as IP eXchanges, IPX, towards a receiving SEPP. The receiving SEPP receives a message sent by the sending SEPP and forwards the message towards an NF within its operator's network, e.g. the AUSF.

In the example of FIG. 1, communication between a service-consuming NF and a service-producing NF, henceforth referred to as NFc 120 and NFp 122. They may also be referred to as NF service consumer and NF service producer, respectively. As noted, the NFc and NFp may reside in the same PLMN or in different PLMNs.

A service communication proxy, SCP, 150 may be deployed for indirect communication between network functions, NFs. An SCP is an intermediate network entity to assist in indirect communication between an NFc and an NFp, including routing messages, such as, for example, control plane messages between the NFs, and optionally including discovering and selecting NFp 122 on behalf of NFc 120 or requesting an access token from the NRF 140, 142 or an Authorization Server on behalf of NFc 120 to access the service of NFp 122.

Direct communication may be applied between NFc 120 and NFp 122 for an NF service, or NF service communication may be performed indirectly via SCP(s) 150. In direct communication, the NFc 120 performs discovery of the target NFp 122 by local configuration or via local NRF, cNRF 140. In indirect communication, the NFc 120 may delegate the discovery of the target NFp 122 to the SCP 150. In the latter case, the SCP may use the parameters provided by NFc 120 to perform discovery and/or selection of the target NFp 122, for example with reference to one or more NRF.

NF discovery and NF service discovery enable entities, such as NFc or SCP, to discover a set of NF instance(s) and NF service instance(s) for a specific NF service or an NFp type. The NFc and/or the SCP may be core network entities. The network repository function, NRF, may comprise a function that is used to support the functionality of NF and NF service registration, discovery, authorization and status notification. Additionally or alternatively, the NRF may be configured to act as an authorization server. The NRF may maintain an NF profile of available NFp entities and their supported services. The NRF may notify about newly registered, updated, or deregistered NFp entities along with its NF services to a subscribed NFc or SCP. An NRF may thus advise NFc entities or SCP concerning where, that is, from which NFp entities, they may obtain services they need. An NRF may be co-located together with an SCP, for example, run in a same computing substrate. Alternatively, NRF may be in a physically distinct node than an SCP or even hosted by a service provider.

In order for the NFc 120 or SCP 150 to obtain information about NFp 122 and/or NF service(s) registered or configured in a PLMN/slice, NFc 120 or SCP 150 may initiate, based on local configuration, a discovery procedure with an NRF, such as cNRF 140. The discovery procedure may be initiated by providing the type of the NFp and optionally a list of the specific service(s) it is attempting to discover. The NFc 120 or SCP 150 may additionally or alternatively provide other service parameters, such as information relating to network slicing.

It is to be noted that at least some of the entities or nodes 120, 122, 140, 142 may act in both service-consuming and service-providing roles and that their physical structure may be similar or identical, while their role in the present examples in delivery of a particular message or service is identified by use of the prefix/suffix "c" or "p" indicating whether they are acting as the service-consuming or service-producing NF. It is to be noted that instead of "c" and "p", "v" for visited and "h" for home can be used to refer to at least some respective entities in the visited and home PLMNs. In some embodiments, a system implementing an embodiment of the present disclosure comprises both fourth generation, 4G, and fifth generation, 5G, parts.

In some embodiments OAuth based service authorization and/or token exchange is applied between NFc and NFp for the purpose of authorizing an NFc to access the service of an NFp. Alternatively to OAuth, another authorization framework may be applied. Thus, a network entity, such as an NRF, may be or perform as an authorization server, AS, such as an OAuth authorization server, for example. The NFc may be an OAuth client and the NFp may operate as OAuth resource server, and they may be configured to support OAuth authorization framework as defined in RFC 6749, for example.

In general, a network support function such as an NRF may further be configured to act as an authorization server, and provide the NFc, or an SCP acting on behalf of the NFc, with a cryptographic access token authorizing the NFc to use the service provided by the NFp. In general, an NRF is a terminological example of a network support node. In general, an SCP is a terminological example of a proxy entity. The NFc or SCP may include the access token in a request message when requesting the service from the NFp, for example in an "authorization bearer" header. Such an access token may be referred to herein briefly as a token. For example, the NRF may act as an OAuth 2.0 authentication server. The token may comprise e.g. identifiers of the NFc, NRF and/or NFp, a timestamp and/or an identifier of the specific service which is authorised for the NFc with the token. The token may comprise a token identifier of itself, for example a serial number. The token identifier may uniquely identify the token. The token may be cryptographically signed using a private key of the NRF. A validity of such a cryptographic signature may be verified using the corresponding public key of the NRF, which the NFp may obtain in connection with registering with the NRF the service(s) it offers, for example. When the NFc contacts the NFp, it may present the access token, which the NFp may then verify, for example at least in part by using its copy of the public key of the NRF. A message authentication code, MAC, based cryptographic signature may be used in some embodiments instead of, or in addition to, an asymmetric-cryptography based signature. Issuing an access token via a service communication proxy may comprise the proxy using the access token on behalf of the NFc with or without forwarding it to the NFc.

When requesting a service from an NFp, an NFc or an SCP acting on behalf of the NFc may include in a service request the access token authorizing access to the service, and a credential data element, such as CCA, of the NFc and/or the SCP. A CCA may comprise, for example, one, more than one or all of the following fields:

CCA (NFc)
sub: NFc Instance id
iat: Issue Time
exp: Expiry time
aud: NFp
NF Set ID: set id Here sub is an NF instance identifier of the NFc, which generates this CCA. Here iat is a timestamp declaring the time of issue of the CCA, and exp an expiry time of the CCA. Here aud is a list of NF types expected to process the CCA, in this example the CCA is aimed at use in NFps. The set id, which is optional in the sense that in at least some embodiments it is absent, identifies a set of NF instances in which the NFc is comprised.

Figure 2:
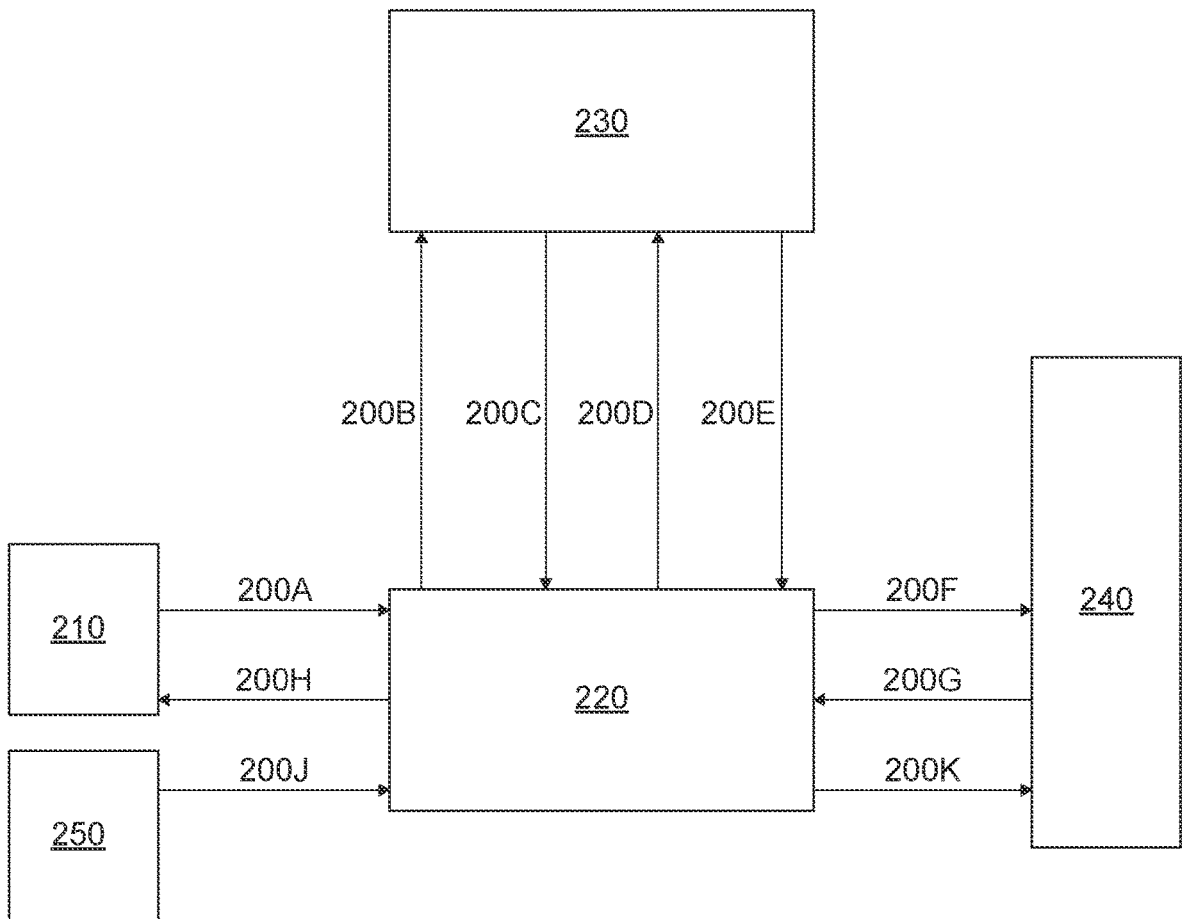
FIG. 2 illustrates an example system in accordance with at least some embodiments of the present invention.

FIG. 2 illustrates an example system in accordance with at least some embodiments of the present invention. NFc 210 wants to consume a service provided by NFp 240. Indirect communication via SCP 220 is used in the example of FIG. 2, although as will be described herein, other embodiments use direct communication between NFc and NFp, without SCP. In service request 200A the NFc 210 requests the service by transmitting the request to SCP 220. The service request may comprise a credential data element of NFc 210, such as, for example, a client credentials assertion, CCA, data element that enables the receiving NF, e.g. NRF or NFp, to authenticate NFc 210. In general, a CCA data element may take the form of a JavaScript Object Notation, JSON, web token, for example. The credential data element may comprise an NF instance set identifier, for example.

In response to service request 200A, SCP 220 issues a discovery message 200B to NRF 230. Discovery message 200B may describe the service NFc 210 seeks, based on information expressed in service request 200A. SCP 220 may include in discovery message at least one of: the credential data element of NFc 210, or a credential data element of SCP 220 itself.

Responsive to discovery message 200B, NRF 230 may respond with a NF profile message 200C which may describe NFp entities which offer the service NFc 210 wishes to obtain. SCP 220 may select one of the NFp entities from the profile message 200C on behalf of NFc 210, and request an access token for the selected NFp in message 200D, which may comprise an identifier of the selected NFp, in the case of FIG. 2, this is NFp 240. Responsive to access token request 200D, the NRF may provide the requested access token to SCP 220 in message 200E. The access token may authorize access to the specific service in NFp 240 that NFc 210 is interested in, for example. The access token may comprise an identifier of NFc 210. The identifier of NFc 210 may be obtained by NRF 230 from the credential data element of NFc 210, for example, in embodiments which use credential data elements.

SCP 220 may then request the service from NFp 240 by sending to NFp 240 service request message 200F. Request message 200F may comprise the access token received in SCP 220 in message 200E and the credential data element, such as CCA, of NFc 210. After verifying the access token, NFp 240 may perform an authentication wherein NFp 240 compares a first identifier, comprised in the access token in service request 200F, to a second identifier, comprised in the credential data element of NFc 210 in service request 200F, wherein the authentication is successful when the first identifier and the second identifier identify a same network function instance or same network function instance set. Thus the NFp may check that the access token in service request 200F has been granted to enable access to the service for the specific NFc requesting the service. Of course, NFp 240 may alternatively first perform the authentication and then verify the access token. Verifying the access token may comprise checking a cryptographic signature on the access token. Responsive to the authentication process indicating the service may be provided and the access token being verified as correct, NFp 240 may provide results of the requested service in message(s) 200G, these results then being made available to the NFc 210 by SCP 220 in message(s) 200H. In sum, determining whether to provide the service may comprise the authentication and, optionally, the verification of the access token signature.

A second NFc 250 may request a service, for example the same service that NFc 210 requested in phase 200A, in service request 200J. NFc 250 may try to masquerade as NFc 210. SCP 220 may determine that it already has an access token for the service, cached from phase 200E, and issue a service request 200K to NFp 240. The role of NRF 230 as authorisation server is in this case sidestepped, and NFc 250 has not, in fact, been authorised to access the service in NFp 240. The service request of phase 200K would thus comprise a credential data element of NFc 250, and the access token provided in phase 200E to authorise NFc 210 to access the service. To guard against this, SCP 220 may be configured to check, that the access token has been generated for the requesting NFc, and not another NFc, before re-using a cached access token in a service request.

NFp 240, when performing the authentication process, will realize that the first and second identifiers, in the access token and the credential data element in service request 200K do not match. In detail, the first identifier in the access token will identify NFc 210, while the second identifier in the credential data element, such as CCA, will identify NFc 250. The authentication process would only succeed in case NFc 210 and NFc 250 are in a same NFc Set, in which case the set identifier in the access token could be the same as a set identifier in a credential data element of NFc 250. If this is not the case, NFp 240 may be configured to return an error message, or to merely discard service request 200K.

SCP 220 may re-use the access token of NFc 210 by accident, or in case the SCP is acting maliciously. The SCP may act maliciously in case it has been infected by malware, for example. In embodiments where direct communication is used and NFc 210 issues a service request to NFp 240 such that the service request does not traverse an SCP, a man-in-the-middle, MITM, attacker could copy the access token of NFc 210 from the service request before it arrived at the NFp, and later use the copied access token to request a service to another NFc, such as NFc 250. Also in that case the NFp 240 would be in a position to reject the service request, since the first and second identifiers in the service request would not match. In detail, the identifier in the access token would not match the identifier in the credential data element. In case direct communication is used and NFc 210 issues the service request to NFp 240 without directing the service request to an SCP, the NFp may check whether an identifier of the NFc in the access token it receives in the service request identifies a same NFc as an NFc identifier in a cryptographic certificate used to secure a connection between the NFp and the NFc side. An example of such a certificate is a TLS certificate, and an example of an NFc identifier in a TLS certificate is an identifier in a subjectAlt-Name field of the certificate.

In case of indirect communication when roaming, the described authentication process is very useful if the credential data element of the NFc is enabled for roaming. The NFp in the home PLMN, hPLMN, can verify if the service request originates in a genuine NFc in the visited PLMN by comparing the NF instance identifier present in the credential data element sent by the NFc in vPLMN to the NF instance identifier present in the access token generated by the NRF present in the hPLMN, for example.

In some embodiments, the NFp is configured to decide whether or not to perform the authentication based on contents of the service request. The NFp may be configured to only perform the authentication in case at least one criterion is met. For example, the NFp may be configured to decide whether or not to perform the authentication based on a network function type of a network function consumer indicated in the service request. As a specific example, the NFp may be configured to perform the authentication responsive to the type of the network function consumer indicated in the service request being a network exposure function, when the NFp itself is a unified data management node. For example, the criterion may relate specifically to a NEF as NFc requesting user equipment data provisioning, known as UDM-PP service, from a UDM as NFp. Another example of the criterion is that the authentication is performed when AMF requests an authentication request to AUSF acting as NFp. To enable the authentication, the NFc may be configured to include its credential data element to all service requests, regardless of whether an SCP is used. As another example, then the NFc is a NEF or AMF it may include the credential data element to its service requests requesting a service from a UDM or AUSF, and to otherwise not include its credential data element in service requests.

Figure 3:
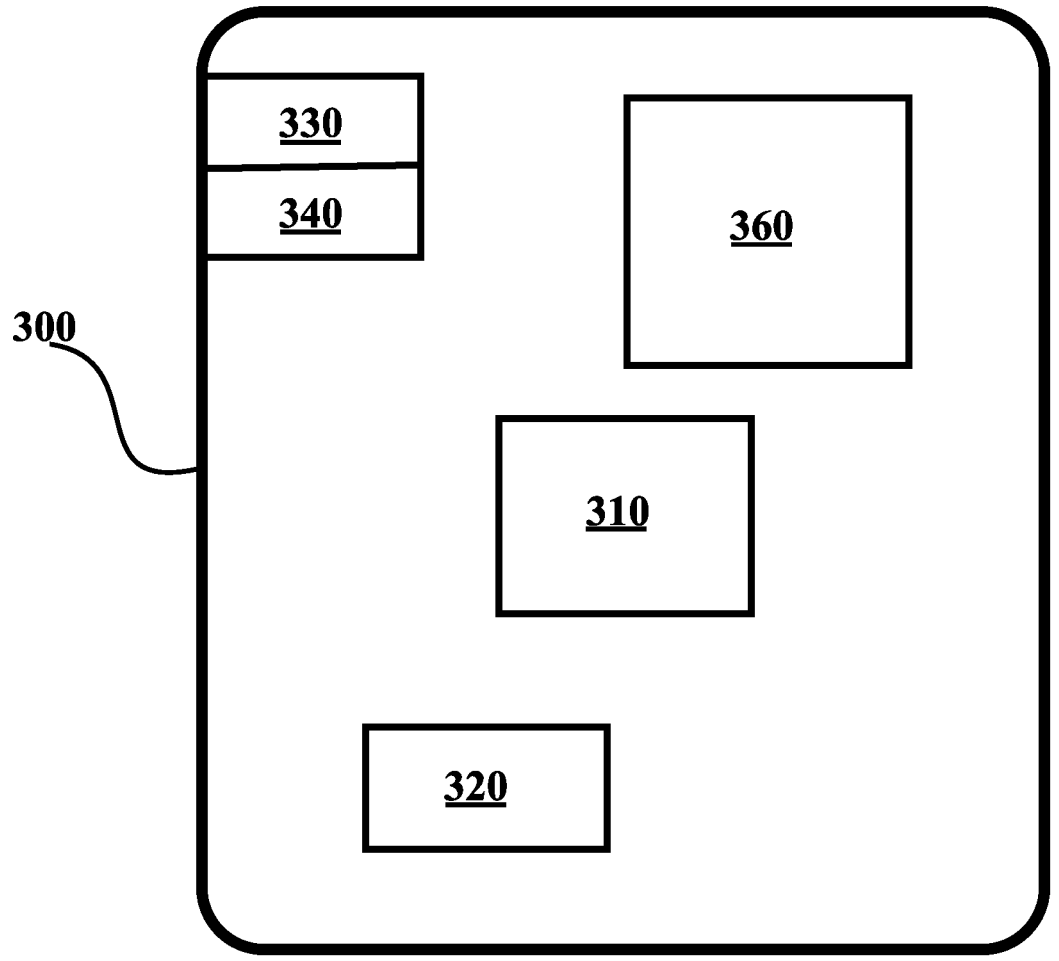
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, in applicable parts, a physical node running a NFp, and/or a NFc, for example. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices, AMD, Corporation. Processor 310 may comprise at least one AMD Epyc and/or Intel Atom processor. Processor 310 may comprise at least one application-specific integrated circuit, ASIC. Processor 310 may comprise at least one field-programmable gate array, FPGA. Processor 310 may be means for performing method steps in device 300, such as receiving, determining, including and/or providing, for example. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with a suitable messaging protocol.

Device 300 may comprise user interface, UI, 360. UI 360 may comprise at least one of a display, a keyboard or a touchscreen. A user may be able to operate device 300 via UI 360, for example to configure operating parameters, such as authentication policy information, for example.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively, to a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively, to a serial bus, the receiver may comprise a parallel bus receiver.

Device 300 may comprise further devices not illustrated in FIG. 3. In some embodiments, device 300 lacks at least one device described above.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
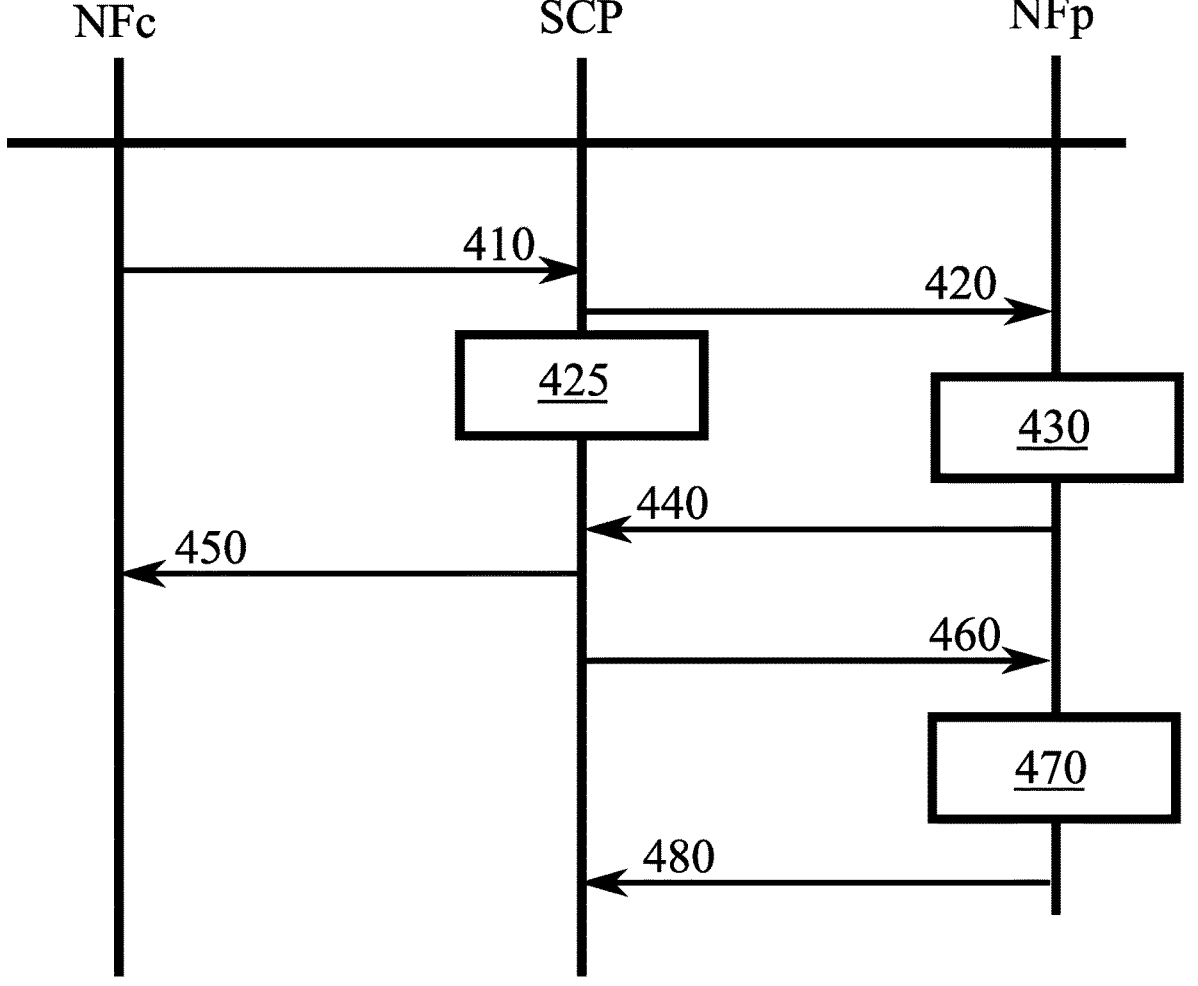
FIG. 4 illustrates signalling in accordance with at least some embodiments of the present invention.

FIG. 4 illustrates signalling in accordance with at least some embodiments of the present invention. On the vertical axes are disposed, on the left, the NFc, in the centre, the SCP and on the right, the NFp. Time advances from the top toward the bottom.

In phase 410, the NFc requests a service provided by the NFp from the SCP. The request of phase 410 may comprise a credential data element of the NFc. In phase 420, the SCP sends a service request to the NFp. This request may include the credential data element of the NFc, such as a CCA, and an access token authorizing the NFc to be provided the requested service from the NFp. The SCP may obtain the access token from a NRF, for example, or from the NFc itself. In phase 425, the SCP caches the access token included in the service request of phase 420 by storing it in a memory comprised in, or accessible to, the SCP.

In phase 430, the NFp analyses the request of phase 420. The NFp may verify the access token by checking a cryptographic signature on the access token of the NRF, or other authorisation server, which issued the token. Further the NFp may perform the authentication process to check, that the first identifier on the access token is the same as the second identifier on the credential data element of the NFc. In case the first and second identifiers identify the same network function instance, or the same set of network function instances, the authentication succeeds. If the authentication succeeds and the access token is successfully verified as authentic, the NFp may provide results of the service to the NFc, phases 440 and 450. Thus a determination whether to provide the service may comprise the authentication and the verification of the access token. In some embodiments, the verification of the access token is not performed.

In phase 460 the SCP issues a spurious service request on behalf of another NFc, using the access token cached in phase 425. The service request of phase 460 thus comprises the same access token as in service request 420, and a credential data element of a different NFc. When the NFp analyses the service request of phase 460 in phase 470, it will detect that while the access token is authentic in the sense that the cryptographic signature of the issuing NRF, or other authorisation server, is correct, the first identifier in the access token identifies a different network function than the second identifier, in the credential data element of phase 460. The NFp will thus be in a position to refuse the service request of phase 460, by sending an error message back to the SCP in phase 480. The error message may be a 4xx error message, for example, carrying a reason code indicating authorization failure due to NF instance id mismatch.

FIG. 5 is a flow graph of a method in accordance with at least some embodiments of the present invention. The phases of the illustrated method may be performed in a NFp, or in a control device configured to control the functioning thereof, when installed therein.

Phase 510 comprises receiving, in an apparatus, a service request for a service provided by the apparatus. The service request may be received from a proxy entity such as, for example, a service communication proxy, SCP. Alternatively, the service request may be received directly from an NFc such that the service request does not traverse an SCP. Phase 520 comprises determining whether to provide the service based at least partly on an authentication based on a first identifier, comprised in an access token in the service request, and on a second identifier, comprised in a credential data element in the service request, wherein the authentication is successful when the first identifier and the second identifier identify a same network function instance or same network function instance set. Phase 530 comprises providing the service responsive to a result of the determination indicating the service is to be provided. The access token is distinct from the credential data element.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The expression "at least one of A or B" in this document means A, or B, or both A and B.

INDUSTRIAL APPLICABILITY

At least some embodiments of the present invention find industrial application in communication network security.

ACRONYMS LIST

API application programming interface
FQDN fully qualified domain name

NFc network function consumer
NFp network function producer
NRF network repository function
SCP service communication proxy
The invention claimed is:

1. An apparatus comprising at least one processing core, at least one memory including computer program code, the at least one memory and the computer program code being configured to, with the at least one processing core, cause the apparatus at least to:

receive a service request for a service provided by the apparatus;

determine whether to provide the service based at least partly on an authentication based on a first identifier of a network function service consumer, comprised in an access token in the service request, and on a second identifier, comprised in a credential data element in the service request, wherein the access token comprises a cryptographic signature of a network repository function, wherein the authentication is successful when the first identifier and the second identifier identify a same network function instance or same network function instance set, wherein the credential data element comprises a client credentials assertion data element comprising a network function instance identifier of the network function service consumer, wherein the client credentials assertion data element is generated by a service consuming network function, wherein the apparatus is further configured to decide whether or not to perform the authentication based on contents of the service request, wherein the apparatus is further configured to perform the deciding whether or not to perform the authentication based on a network function type of a network function consumer indicated in the service request, wherein the apparatus is further configured to perform the authentication responsive to the type of the network function consumer indicated in the service request being a network exposure function, and wherein the apparatus is configured to be a unified data management node; and provide the service responsive to a result of the determination indicating the service is to be provided.

2. The apparatus according to claim 1, wherein the apparatus is further configured to receive the service request from a proxy entity.

3. The apparatus according to claim 1, wherein the access token comprises an OAuth token in accordance with standards established by the internet engineering task force.

4. The apparatus according to claim 1, wherein the credential data element comprises a cryptographic signature of the network function consumer.

5. The apparatus according to claim 4, wherein the credential data element comprises a transport layer security, TLS, certificate, and wherein the service request is not received in the apparatus via a service communication proxy.

6. The apparatus according to claim 1, wherein the apparatus is further configured to decide to perform the authentication responsive to the type of the network function consumer indicated in the service request being a function configured to provide access to exposed network services and capabilities, wherein the apparatus is configured to manage network user data in a single, centralized element.

7. The apparatus according to claim 1, wherein the apparatus is further configured to transmit an error message to a node from which the service request is received, responsive to the authentication being unsuccessful.

8. An apparatus comprising at least one processing core, at least one memory including computer program code, the at least one memory and the computer program code being configured to, with the at least one processing core, cause the apparatus at least to:

transmit a service request for a service at a network function provider to the network function provider without routing the service request to a service communication proxy, wherein the service request comprises an access token, wherein the access token comprises a cryptographic signature of a network repository function, and comprises an identifier of a network function service consumer, wherein the service request indicates a network function type of a network function consumer, wherein the service request comprises a credential data element, wherein the credential data element comprises a client credentials assertion data element comprising a network function instance identifier of the network function service consumer, and wherein the client credentials assertion data element is generated by a service consuming network function;

receive, from the network function provider, results of the service request, wherein the results comprise an indication of a successful authentication of the apparatus based on the access token and the credential data element; and receive the requested service from the network function provider based on the successful authentication of the apparatus.

9. The apparatus according to claim 8, wherein the apparatus is further configured to include in the credential data element an identifier of a set in which a network function the apparatus is configured to perform is comprised in.

10. A method, comprising:

receiving, in an apparatus, a service request for a service provided by the apparatus;

determining whether to provide the service based at least partly on an authentication based on a first identifier of a network function service consumer, comprised in an access token in the service request, and on a second identifier, comprised in a credential data element in the service request, wherein the access token comprises a cryptographic signature of a network repository function, wherein the authentication is successful when the first identifier and the second identifier identify a same network function instance or same network function instance set, wherein the credential data element comprises a client credentials assertion data element comprising a network function instance identifier of the network function service consumer, wherein the client credentials assertion data element is generated by a service consuming network function, wherein the apparatus is further configured to decide whether or not to perform the authentication based on contents of the service request, wherein the apparatus is further configured to perform the deciding whether or not to perform the authentication based on a network function type of a network function consumer indicated in the service request, wherein the apparatus is further configured to perform the authentication responsive to the type of the network function consumer indicated in the service request being a network exposure function, and wherein the apparatus is configured to be a unified data management node; and providing the service responsive to a result of the determination indicating the service is to be provided.

11. The method according to claim 10, wherein the service request is received from a proxy entity.

12. The method according to claim 10, wherein the access token comprises an OAuth token in accordance with standards established by the Internet Engineering Task Force.

13. The method according to claim 10, wherein the credential data element comprises a cryptographic signature of the network function consumer.

14. The method according to claim 13, wherein the credential data element comprises a transport layer security, TLS, certificate, and wherein the service request is not received in the apparatus via a service communication proxy.

\*     \*     \*     \*     \*